United States Patent

[11] 3,574,945

| [72] | Inventors | John R. Main<br>2101 Fountain View Drive, No. 1;<br>Newell R. Wall, 2200 Willowick, Houston,<br>Tex. 77027 |
|---|---|---|
| [21] | Appl. No. | 844,016 |
| [22] | Filed | July 23, 1969 |
| [45] | Patented | Apr. 13, 1971<br>Continuation-in-part of application Ser. No. 648,577, June 26, 1967, now abandoned. |

[54] MEASURING INSTRUMENT
8 Claims, 10 Drawing Figs.

[52] U.S. Cl. .................................................. 33/70, 33/97
[51] Int. Cl. .................................................. G01c 1/00
[50] Field of Search ....................................... 33/97, 70, 98, 92, 105, 102

[56] References Cited
UNITED STATES PATENTS

| 669,395 | 3/1901 | Lane | 33/97 |
| 697,335 | 4/1902 | Hagan | 33/97 |
| 920,450 | 5/1909 | Frohne | 33/97 |
| 964,246 | 7/1910 | Hagan | 33/97 |
| 1,296,372 | 3/1919 | Dittrick | 33/70(C) |
| 1,473,860 | 11/1923 | Mullarkey | 33/98 |
| 1,514,323 | 11/1924 | Kirchner | 33/98 |
| 2,112,114 | 3/1938 | Rainbult | 33/70(B) |
| 2,813,344 | 11/1957 | Howland | 33/70(B) |
| 2,990,620 | 7/1961 | Jagliere | 33/98 |
| 3,083,901 | 4/1963 | Gabriel | 33/97 |

FOREIGN PATENTS

| 117,058 | 6/1943 | Australia | 33/102 |
| 312,521 | 5/1919 | Germany | 33/97 |
| 247,857 | 2/1926 | Great Britain | 33/105 |

Primary Examiner—Harry N. Haroian
Attorney—William E. Ford

ABSTRACT: The invention comprises a measuring instrument including a graduated base blade, longitudinally slotted so that the lower end of a graduated, upright blade may be guidably, slidably connected to the base blade. An adjustably, angularly positionable, graduated, hypotenuse blade is pivotally connected to one end of the base blade. For example, with hypotenuse blade aligned with roof line and upright spaced from pivot on base blade, roof area may be calculated. The blades are adapted to be folded together in releasably latched position for pocket carriage.

Patented April 13, 1971 3,574,945
2 Sheets-Sheet 1
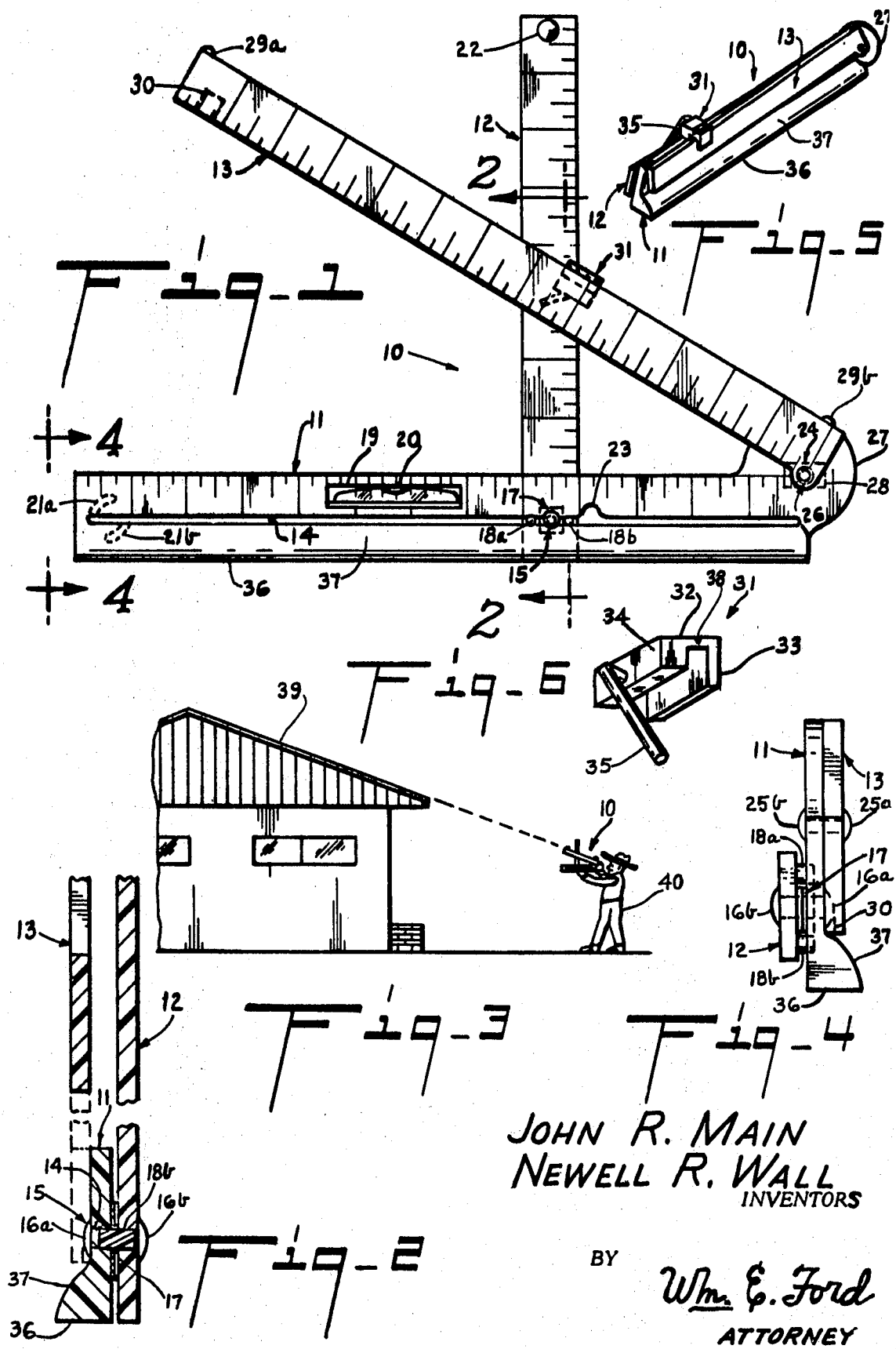
JOHN R. MAIN
NEWELL R. WALL
INVENTORS
BY Wm. E. Ford
ATTORNEY Patented April 13, 1971
3,574,945
2 Sheets-Sheet 2
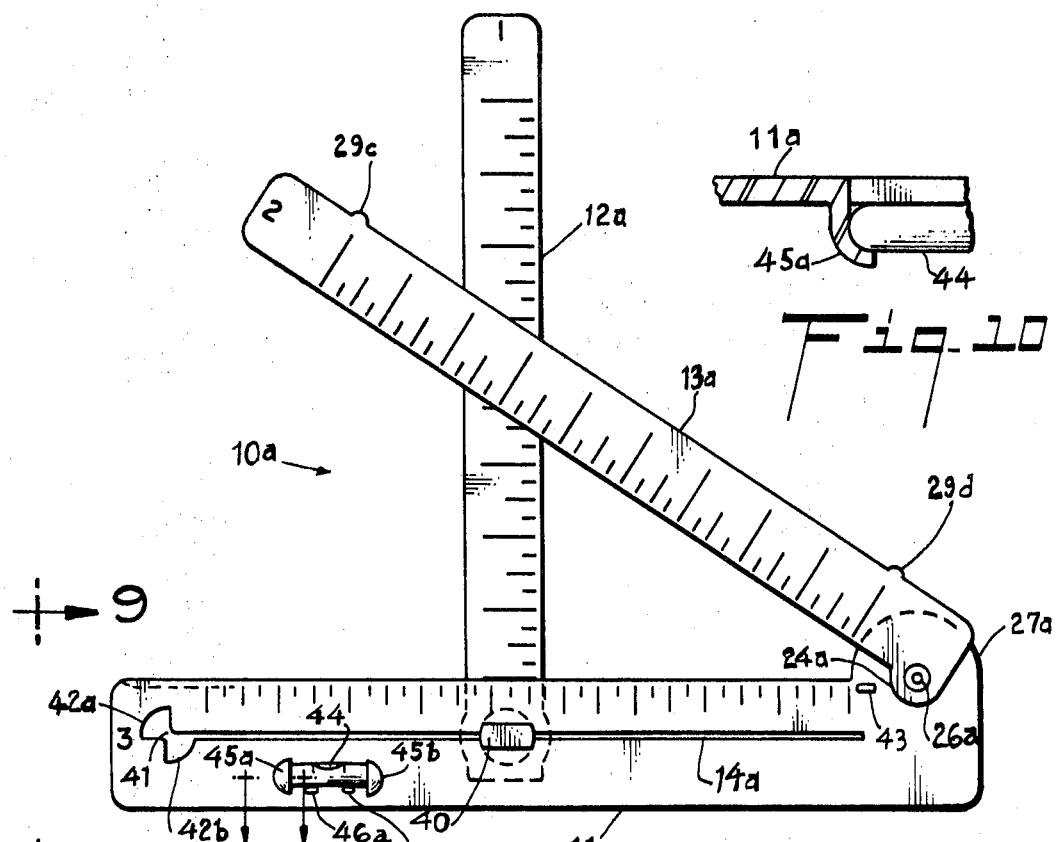
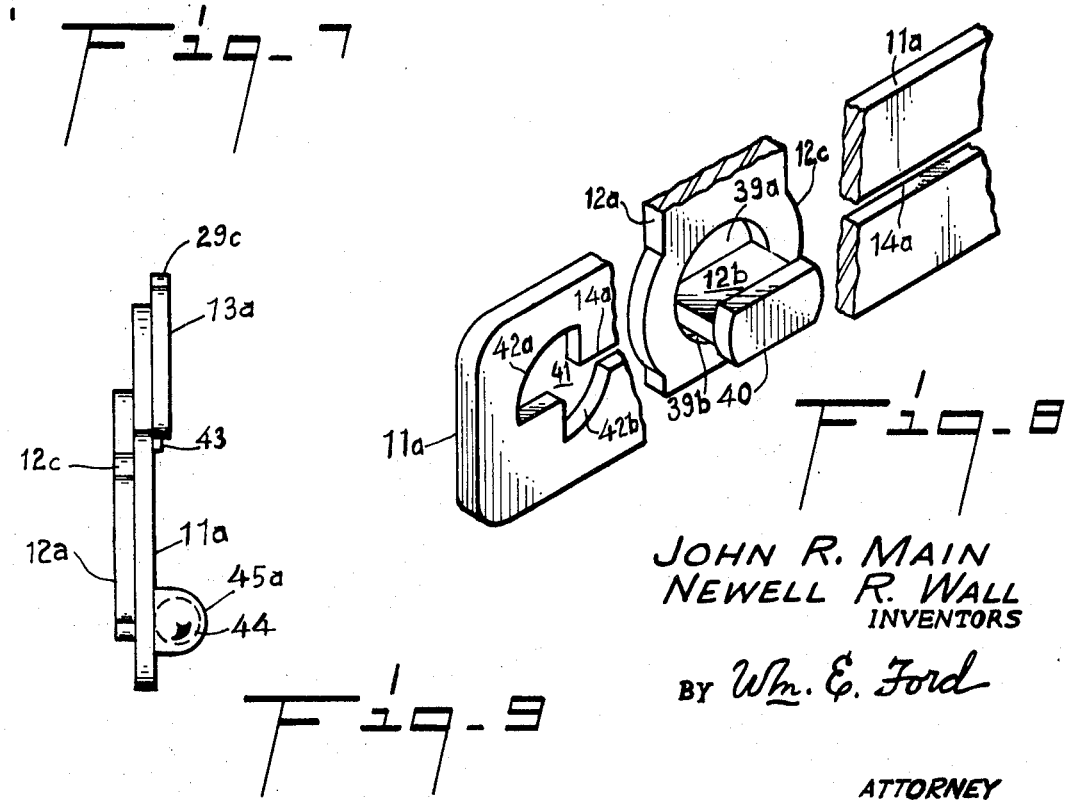
JOHN R. MAIN
NEWELL R. WALL
INVENTORS
BY Wm. E. Ford
ATTORNEY

MEASURING INSTRUMENT

The invention relates to a sighting instrument that enables the rapid calculation of areas, as roof areas, when the roof line comprises the hypotenuse of a right triangle; this application disclosing the invention comprising a continuation-in-part application of pending Application Serial No. 648,577, filed Jun. 26, 1967, for MEASURING INSTRUMENT, now abandoned.

It is a primary object of the invention to provide a sighting instrument of this class which may be sighted along the gable line of a roof when the width of the building is known, including the eave overhang, and the roof area thereby being readily calculated.

It is also another important object of the invention to provide a measuring or sighting instrument of this class which is of light weight, readily foldable into releasably latched position, and of size for pocket carriage.

It is yet a further object of the invention to provide a sighting or measuring instrument of this class which may be most inexpensively constructed, the blades being formed of a moldable material, as plastic.

It is still another object of the invention to provide a sighting or measuring instrument of this class which may be employed to take sights with the operator standing in front of a side of a building being measured and sighting along the roof line.

It is also a special and important object of the invention to provide a sighting or measuring instrument of this class which may be employed by the operator as he stands off the gable end of the building with roof area to be measured.

It is still another and important object of the invention to provide a measuring or sighting instrument of this class, in which the upright blade is readily adjustably positionable along the base blade by virtue of the provision of a longitudinally extending slot in the base blade.

It is also a further object of the invention to provide a sighting or measuring instrument of this class in which the upright blade is easily disposed to be pivoted downwardly from one end of the base blade as the hypotenuse blade is readily pivoted downwardly from the other end of the base blade, thus to place the three blades readily in releasably latched, folded together position.

It is yet a further and important object of the invention to provide a sighting or measuring instrument of this class in which the upright blade carries guide means to maintain the upright blade adjustably slidable along the longitudinally slotted base blade, with such guide means being cooperative with the particularly relieved end of the base blade opposite the hypotenuse blade mounting end, in manner that the upright blade may be pivoted in the relieved end into parallel extending, releasably, frictionally latched folded relation therewith.

It is also another and further object of the invention to provide a sighting or measuring instrument of this class with hypotenuse blade being pivotally mounted on base blade end in manner that it may be pivoted downwardly against a stop on the base blade adjacent pivot for parallel extending, releasably, frictionally latched folded relation with the base blade.

It is still a further object of the invention to provide a sighting or measuring instrument of this class with base blade having end caps and support lugs integrally formed thereon to support a bubble level capsule therein.

Other and further objects will be apparent when the specification herein is considered in connection with the drawings, in which:

FIG. 1 is a side elevational view of an embodiment of the invention;

FIG. 2 is a transverse sectional elevation, taken along line 2-2 of FIG. 1;

FIG. 3 is an elevational view showing a method of using the instrument to measure a roof area;

FIG. 4 is an end elevation taken along line 4-4 of FIG. 1;

FIG. 5 is an isometric view of the blades comprising the invention folded for pocket carriage;

FIG. 6 is an isometric view of a spacer clamp which may be employed when the instrument is in service to space the upright blade and hypotenuse blade apart and to hold selected positions, and to hold the instrument compactly folded for pocket carriage when not in service.

FIG. 7 is a side elevational view of a preferred form of the invention added by this application;

FIG. 8 is an end elevational view of the instrument shown in FIG. 7 in folded position;

FIG. 9 is an isometric development view of left end parts of base blade and lowermost part of upright blade, whereby interengagement of parts when folded, may be visualized; the lowermost part of upright blade being shown to exaggerated scale with relation to the base blade end part; and FIG. 10 is an enlarged, fragmentary plan view showing detail of mounting the bubble level capsule.

Referring now to the drawings in which like reference numerals are applied to like elements in the various views, a measuring instrument 10 is shown in FIG. 1 as comprising a graduated base blade 11, a graduated upright blade 12 connected to upstand from the base blade 11, and a graduated hypotenuse blade 13 pivotally connected to one end of the base blade 11 to extend across the upright 12 at variously selected angles to the horizontal corresponding with the pitches of various roofs to be measured. The base blade 11 has a longitudinally extending slot 14 therein to extend horizontally when the instrument is leveled in service.

The upright blade 12 is connected to the base blade 11 by means of a rivet 15 which extends from an outer head 16a, wider than the slot 14, with shank passing through the slot 14 and through the lower end of the upright blade 12, centrally thereof, so that the rivet head 16b is on the side of the upright 12 opposite the blade graduations which an operator observes. A leaf spring 17 is disposed between the base blade 11 and the upright blade 12 to tension the upright blade 12 better to upstand firmly. Also lugs 18a, 18b are provided in the lower end of the upright blade 12 and in transverse alignment on opposite sides of the rivet 15, thus to extend into the slot 14, thus to maintain the upright blade 12 to upstand substantially perpendicularly to the base blade 11 and the slot 14 therein.

Other features included by the base blade 11 comprise a rectangular hole 19 cut therethrough as shown in FIG. 1 so that a bubble level 20 may be mounted therein in protected position while at the same time visible to the operator of the instrument. Also two oppositely constructed arcuate recesses 21a, 21b are provided at the left end portion of the base blade 11, one recess 21a extending from the end of the slot 14, and the other recess 21b extending from the slot at a spaced distance from the slot 21a equal to the space between the lugs 18a and 18b across the upright blade 12.

Thus the upright blade 12 may be slid to the left, as shown in FIG. 1, to the end portion of the slot 14, to dispose the lug 18a at the end in communication with the recess 21a, and the lug 18b in communication with the recess 21b. Thus the upright blade 12 may be pivoted, about the rivet 15, downwardly toward the right to fold the blade 12 into position with longitudinal axis of the blade 12 substantially parallel with the longitudinal axis of the base blade 11, as the lugs 18a, 18b, disposed in the respective upper and lower ends of the recesses 21a, 21b, releasably latch the blade 12 in downfolded position. To insure that the blade 12 remains downfolded until the instrument 10 is to be used again, a detent 22 is provided on the graduated face of the upper end of the blade 12, centrally thereof, this to be fitted into a recess 23 provided in the base blade 11, the recess comprising the provision of an enlargement of the slot 14 at an appropriate distance from the downfolding pivot of the blade 12 near the left end of the base blade 11.

The hypotenuse blade 13, pivotally connected to the base blade, as aforesaid, is thus connected by a rivet 24 which has its head 25a disposed over a semicircular projection 26 from the lower right corner of the blade 13, the shank of the rivet passing through the blade 13 and through a modified circular flange or plate 27 forming the right end portion of the base blade 11, and being concentric with the projection 26. Preferably, or optionally, a leaf spring 28 may be installed between the blades 13 and 11, with the shank of the rivet 24 passed therethrough. As the hypotenuse blade 13 is the sight bar or aligning member of the instrument, aligned sighting beads 29a, 29b are provided on the opposite ends of the blade 13, as disposed upon the upper edge face thereof. Also, in order to fold the blade 13 compactly, a recess 30 is provided in the left end portion, extending upwardly from the lower edge face, thus to extend around the rivet head 25a, as shown in FIGS. 2 and 4.

In order that the hypotenuse blade 13 may be positively retained at the angle at which sighted, and in order to maintain the upright blade 12 further supported in upright position, and also to maintain the instrument more compactly, releasably, latchably folded for pocket carriage when not in use, a spacer clamp 31 may be provided as optional apparatus. See isometric views of FIGS. 5 and 6, and the clamp in phantom in FIG. 1. Such spacer clamp 31 may include a channel 32 with longer leg 33 to the right, and with wider leg 34 to the left, as best shown in FIGS. 5 and 6. Thus the leg 33 may fit beside the hypotenuse 13 while the leg 34 seats upon the upper edge face of the base blade 11 and overextends the leaf spring 17, both as shown in FIG. 5, which illustrates the folded position of the instrument. Also, in this view a clamp bar 35 is shown extending outwardly from the leg 34, and then forwardly and downwardly better to clamp the blade 12 toward the base blade 11, when the blade 12 is in downfolded position.

Also, it should be noticed that the clamp is slidable upon the hypotenuse blade 13 when the instrument is in use to dispose the leg 34 to space the hypotenuse blade 13 from the upright blade 12, as the leg 33 slides along the graduated face of the hypotenuse blade 13, the clamp bar 35 meantime extending in clamping contact behind the upright blade 12. The portion of the spacer clamp 31 which rides upon top of the hypotenuse blade 13 has a sighting V-groove 38 therein which is of depth and of such disposition that the bottom of the V is in alignment with the top portions of the sighting beads 29a, 29b.

It should be noticed from a consideration of FIGS. 2, 4, and 5 that the base blade 11 has an enlarged bottom portion 36 of modified triangular cross section, with the hypotenuse side 37 slightly convex. This is for the purpose of providing a base so that the instrument may be seated with the aforesaid bottom portion 36 as its base, thus with the clamp 31 uppermost. Also, the convex surface 37 provides a stop for the hypotenuse blade 13 when the instrument is in folded position.

OPERATION

In operation the user of the instrument has first measured the width of the building at the foundation line. One-half this measured width plus the horizontal component of the eaves, or eave overhang, in feet, is then set as an abscissa measured in inches from the center of the rivet 26 along the graduated scale on the base blade 11 when this base blade is held level in the horizontal, as indicated by the bubble level 20. Then the right edge of the upright blade 12 is moved along the slot 14 to the inch graduation on the base scale corresponding with the aforesaid abscissa in feet. The user or operator 40 may now take position, as in FIG. 3, and, holding the base blade 11, as levelled, he may move the hypotenuse blade 13, as he sights therealong, until the top edge of the hypotenuse blade 13 is in alignment with, or in extension of, the plane of the roof 39. Thus, the graduated distance along the under edge surface of the pivoted, or hypotenuse blade 13, as read in inches, will correspond to the roof measurement from ridge to outermost point of eave overhang in feet. Then, with the length of the roof known to be the length of the building plus twice the end overhang, the hypotenuse measurement multiplied by the roof length will give the area of one-half of the roof in square feet.

Also, if an operator knows one-half the building width plus the horizontal component of one eave overhang, he may stand off an end of the building, and with this distance established on the base blade by the position of the right edge of the upright blade from the center of the rivet 26, he may then raise the hypotenuse blade to a position of alignment, with the roof line, and the dimension in inches along the under side of the hypotenuse blade will correspond with the roof distance from ridge to overhang in feet.

The invention should be of especial advantage to estimators, insurance adjusters, property owners and the like, as it saves them the necessity of going up on roofs to take measurements. Thus roof damage by walking thereon is avoided, also danger of personal injury in climbing, and in using ladders. Also, the invention saves calculation time both as to gable roof and hip roof structures.

Since the blades of the instrument may be folded together for pocket carriage, it is easy to take the instrument to locations where needed. Also, since the blades, including their special complications of slots, recesses, detents and projections, may be reproduced in plastic in moulds, the invention can be made for a substantially lesser unit cost than if they were made from metal in machine shops, or of sheet metal by punch presses.

The invention is not limited to the particular structural combinations shown, but other embodiments and structural arrangements are included, as long as such may fall within the broad spirit of the invention, and within the broad scope of interpretation claimed for, and merited by, the appended claims.

Referring now to FIGS. 7—10, inclusive, which disclose the part of the herein application added as new, and which also disclose a preferred embodiment of the invention, a measuring instrument 10a is disclosed comprising a graduated base blade 11a, a graduated hypotenuse blade 13a that is pivotally mounted upon a rivet or pivot pin 26a to the forward face of the right end portion of the base blade 11a, and a graduated upright blade 12a that provides a part of rectangular cross section 12b. This upright blade part 12b slides in a longitudinally extending slot 14a that extends centrally down the base blade 11a, as the upright blade 12a bears against the rear face of the base blade 11a, and as the hypotenuse blade 13a bears across the forward face of the upright blade 12a at the variously selected angles to the horizontal at which the hypotenuse blade 13a may extend, corresponding with the pitches of various roofs to be measured.

Noticeably the hypotenuse blade 13a has a forward sight bead 29c formed upon its free end upper edge, and also a rear sight bead 29d is formed upon its pivoted end upper edge, whereby sight may be aligned down said hypotenuse blade. Also, noticeably, the rivet or pivot pin 26a that mounts the hypotenuse blade 13a extends forwardly from a modified circular plate or flange 27a included by this end portion of the base blade 11a, to pass through a semicircular projection 24a which extends downwardly from the pivoted end lower edge of the hypotenuse blade 13a.

The upright blade 12a has its lower end portion 12c enlarged concentrically around a circular hole defined therewithin, the hole being transversely bisected by a bar or plate portion of rectangular cross section included by the rectangular cross section part or slide guide 12b. As thus bisected, there is provided an upper opening 39a and a lower opening 39b. Outwardly of the horizontally extending plate or bisecting bar portion 12b there is provided a retaining, holddown, or cross flange portion 40 which is mounted upon, and included by, the rectangular cross section plate 12b, which extends above and below the slot 14a in the base blade 11a. Thus, as the upright blade 12a is slid along the slot 14a, in its raised position, and thus perpendicular to the base blade 11a, the inner face of the retainer flange 40 bears guidably or frictionally against the outer face of the base blade 11a and retains the upright blade 12a and base blade 11a in assembly as the forward surface of the upright blade lower end part 12c bears frictionally or guidably against the rear surface of the base blade 11a.

Obviously, in order to assembly the upright blade 12a and the base blade 11a, it has been necessary to hold the upright blade 12a at an angle of approximately 45° to the base blade, so that the guide slide part 12c of the upright blade 12a may extend through the space 41 between the quadrant openings 42a and 42b.

Then the upright blade 12a may be pivoted to the left and into upright position, with the outer, under face part of the guide slide plate portion 12c bearing on the substantially horizontally extending surface defining the lower boundary of the outer or upper left quadrant opening 42a at the left or outer end of the base blade 11a. Then the upright blade 12a may be moved horizontally to the right (FIG. 7), as the guide slide bar or plate 12b slides along the slot 14a as the upright blade respective front and rear guide and retaining parts 40, 12c hold the upright blade 12a in assembled upright position with relation to the base blade 11a.

Obviously, when it may be desired to hold the measuring instrument 10a in folded position, the upright blade 12a may be slid to the left end portion of the base blade 11a, and then swung downwardly and toward the right, as the slide guide bar or plate 12b is disposed in the quadrant openings 42a, 42b and in the space 41 therebetween, so that thus, when folded, the normally upper surface of the guide slide 12b bears upon the upright surface defining the inner face of the outer, or upper left quadrant opening 42a. Correspondingly, the normally lower surface of the guide slide 12b bears upon the upright surface defining the outer face of the inner, or lower right quadrant opening 42b. In this manner the upright blade 12a may be said to be releasably, frictionally latched in downfolded relationship with the base blade 11a.

As indicated in FIG. 7, when the hypotenuse blade 13a is folded downwardly to join the upright blade 12a in blade folded position, with upright blade to rear and hypotenuse blade in front of the base blade 11a, the under surface of the hypotenuse blade 13a will contact a small stop lug or projection 43 on the forward face of the base blade 11a, near the pivot pin 26a. This projection or lug 43 is so located with relation to the axis of the pivot pin 26a, that the lower rear side surface of the hypotenuse blade 13a slightly overlaps the upper front surface of the base blade 11a, as indicated by the broken line along the upper left end portion of the base blade 11a. Thus it may be said that when downfolded, the hypotenuse blade 13a is in releasably, frictionally latched engagement with the base blade 11a, similarly as the upright blade 12a is releasably, frictionally latched therewith.

As shown in FIGS. 7, 9 and 10, a level bubble capsule 44 is provided, of transparent material, preferably a plastic, with respective ends interfitted into respective modified hollow hemispherical shell or horizontally spaced apart, mounting brackets 45a, 45b, integrally formed with, to extend forwardly from, the base blade 11a. Also within the sight glass capsule mounting brackets 45a, 45b, two spaced apart support lugs 46a, 46b, are provided to extend outwardly from the front face of the base blade 11a at elevation that the level bubble capsule 44 must bear thereupon for support in assembly.

The nature and use of the measuring instrument 10a indicates that it may best be fabricated of a transparent material, preferably a transparent plastic, which for effect may be injected with color, as with light green. In order to extract a blade having various irregularities cast therewith, as for instance, the upright blade 11a, from a plastic mold, it will be necessary to provide certain openings, as for core parts, whereas such openings otherwise might serve no functional purpose. Thus the openings 39a, 39b, are provided so that the upright blade 12a, having the retainer or cross flange 40 integrally formed therewith, may be withdrawn from its mold.

The invention is not limited to the embodiments disclosed in the drawings, but covers other embodiments falling within the spirit of the invention. Also the appended claims, which complete this application, are exemplary, or by way of example.

I claim:

1. An instrument operative for the solution of plane trigonometric functions encountered in building construction comprising, in combination, a straight rule base blade to extend horizontally graduated as a scale with increment marks at predetermined spaced distances apart and providing a slot to extend longitudinally, substantially centrally thereof, an upright protractor blade graduated as a scale with increment marks at corresponding spaced distances apart with a lower end portion to fit slidably against the rear face of said base blade with a guide slide member including slot slide means extending from said upright blade through said slot and a retainer slide part connected to said slot slide means and overextending said slot against the forward face of said base blade upwardly and downwardly from said slot, and angularly positionable hypotenuse blade graduated as a scale with increment marks at corresponding spaced distances apart, said hypotenuse blade being pivotally connected to one end of said blade to be swung angularly from the pivot over the front surface of said base blade and over the front surface of said upright blade, said base blade also providing arcuate recesses in its end portion opposite said hypotenuse blade pivotal connection, with said arcuate recesses being diagonally opposed across the end of said slot and with the upper recess outwardly, the diametral dimension across said diagonally disposed recesses being at least equal to the length of said slot slide means whereby said blades may be folded together in releasably latched together position for pocket carriage, a bubble level being provided on said base blade whereby to indicate when the base blade is disposed horizontally as said hypotenuse blade is angularly adjusted to extend at the angle to be measured.

2. An instrument as claimed in claim 1, in which said slot slide means is continued across to bisect an otherwise circular hole provided through said upright blade lower end.

3. An instrument as claimed in claim 1, in which said slot slide means is continued across to bisect an otherwise circular hole provided through said upright blade lower end, and in which said upright blade lower end is enlarged concentrically about said otherwise circular hole.

4. An instrument as claimed in claim 1, in which said hypotenuse blade provides two substantially spaced apart sight beads along the upper edge surface thereof.

5. An instrument as claimed in claim 1 in which said arcuate recesses each comprise a substantial quadrant through said base blade and communicating with each other centrally therebetween, with the end of said slot opposite said hypotenuse blade connection communicating with the lower left quadrant.

6. An instrument as claimed in claim 1 in which said slot slide means includes a rivet passing through said slot and through a leaf spring between said base blade and said upright blade, and in which said upright blade also includes guide lug means extending into said slot.

7. An instrument as claimed in claim 1 in which said hypotenuse blade is pivotally connected to said base blade by a rivet, and in which a leaf spring is interposed around said rivet.

8. An instrument as claimed in claim 1 in which a spacer clamp is provided to space said upright blade from said hypotenuse blade and to clamp said upright blade and hypotenuse blade together when in operative position, and to clamp said upright blade and said hypotenuse blades on opposite sides of said base blade when said blades are in folded position for pocket carriage.